US008562193B2

(12) United States Patent
Cozzi

(10) Patent No.: US 8,562,193 B2
(45) Date of Patent: Oct. 22, 2013

(54) WEDGE-BASE BULB SOCKET AND AUTOMOTIVE LIGHT FOR MOTOR VEHICLES AND SIMILAR PROVIDED WITH SAID SOCKET

(75) Inventor: Fabiano Cozzi, Piano D'Arta (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 427 days.

(21) Appl. No.: 12/944,083

(22) Filed: Nov. 11, 2010

(65) Prior Publication Data

US 2012/0120675 A1 May 17, 2012

(51) Int. Cl.
*B60Q 1/00* (2006.01)

(52) U.S. Cl.
USPC ............ 362/549; 362/548; 362/546; 362/507

(58) Field of Classification Search
USPC .......................................... 362/548, 549, 517
See application file for complete search history.

(56) References Cited

U.S. PATENT DOCUMENTS 5,536,174 A 7/1996 Forish
5,879,186 A 3/1999 Harada
6,257,740 B1 7/2001 Gibboney, Jr.
6,461,027 B1 10/2002 Yagi et al.
7,188,980 B2 * 3/2007 Ase et al. ...................... 362/476
7,204,711 B2 * 4/2007 Garcia et al. .................. 439/336
7,284,895 B2 * 10/2007 Goto ............................ 362/645
7,604,386 B2 * 10/2009 Rawlings et al. ............. 362/548
7,887,224 B2 * 2/2011 Theelen et al. ............... 362/549
8,282,252 B2 * 10/2012 Ichikawa ...................... 362/488
2009/0029596 A1 1/2009 Owen, Sr.

FOREIGN PATENT DOCUMENTS

GB 2287141 9/1995

OTHER PUBLICATIONS

European Search Report dated Oct. 19, 2010.

* cited by examiner

*Primary Examiner* — Anabel Ton
(74) *Attorney, Agent, or Firm* — McCarter & English, LLP

(57) ABSTRACT

Wedge-base bulb socket comprising: a supporting base provided with a coupling seat dimensioned to house the plug of the light bulb; two coupling and connecting members which are located inside the coupling seat, and are structured to separately hold the wedge-shaped plug of the light bulb fitted into the coupling seat, and to feed electric current to said light bulb; two electrically conductive elements which extend on the surface of the supporting base up to the edge of the entrance of the coupling seat, on opposite sides of said entrance, and then descend into the coupling seat up to reach each a respective coupling and connecting member; and two respectively-facing additional supporting jaws which are supported by the two electrically conductive elements so as to be located substantially on opposite sides of the entrance of the coupling seat, and structured to clamp the wedge-base light bulb fitted into the socket, so as to firmly hold said wedge-base light bulb in the wedge-base bulb socket.

14 Claims, 3 Drawing Sheets

WEDGE-BASE BULB SOCKET AND AUTOMOTIVE LIGHT FOR MOTOR VEHICLES AND SIMILAR PROVIDED WITH SAID SOCKET

The present invention relates to a wedge-base bulb socket, of the type normally used to produce the lighting equipment of a motor vehicle or motorcycle.

More specifically, the present invention relates to a wedge-base bulb socket of the type normally used in the construction of the front or rear lights of motor vehicles, motorcycles or similar, to which the following description specifically refers without this implying any loss of generality.

The present invention also relates to an automotive light for motor vehicles or similar comprising said socket.

BACKGROUND OF THE INVENTION

As is known, some models of automotive front or rear lights are so small that the conventional bayonet-type filament light bulbs cannot be used as light sources.

In such cases, the manufacturers of automotive lights are obliged to use special filament light bulbs consisting of a glass bulb which ends in a substantially wedge-shaped head or plug which is structured to be inserted/pressed into a specific coupling seat realized in the socket, and which houses the ends of the rheophores that allow the electric current to be carried to the filament housed inside the glass bulb.

These special incandescent light bulbs are traditionally called wedge-base light bulbs, because the terminal head or plug is usually made in one piece with the glass bulb that houses the filament, and they clearly require special sockets that are specifically structured so to hold the wedge-shaped head or plug of the light bulb in place in rigidly and firmly, though easily removable manner, ensuring at the same time the electric current supply to the filament of the light bulb.

In particular, the wedge-base bulb sockets that are mounted in front or rear automotive lights generally consist of a plastic-material supporting plate or base which is generally incorporated into the rear body of the automotive light, and is provided with a coupling seat shaped to house the terminal head or plug of the wedge-base light bulb; and of two tongue clamp connectors which are housed on the bottom of the coupling seat, and are structured so as to embrace and grip two separate portions of the head or plug of the wedge-base light bulb, in order to hold the head or plug of the light bulb firmly in the coupling seat.

More specifically, the two tongue clamp connectors are made of metal, and are structured so as to permanently touch the two rheophores which emerge from the terminal head of the wedge-base light bulb; and the socket is also provided with two metal straps, i.e. made of an electrically conductive material, which are structured so to electrically connect the two tongue clamp connectors to the motor-vehicle electric circuit, or rather to the electric circuit arranged on the body of the automotive light and which, in turn, is connected to the motor-vehicle electric circuit.

In some socket models, the two electric feeding straps are even structured so as to connect the two tongue clamp connectors to the electric circuit on the rear body of the front or rear automotive light, and at the same time so as to hold the two tongue clamp connectors on the bottom of the coupling seat realized in the supporting base.

Unfortunately the tongue clamp connectors that hold the terminal head of the wedge-base light bulb in place in the coupling seat are extremely sensitive to mechanical vibrations, with all drawbacks concerned when the sockets of the type referred above are used in an automotive light.

When used in this application context, in fact, the vibrations and jolting occurring during the normal use of the vehicle can cause the wedge-base light bulb to become misaligned with respect to the optical axis of the light reflector, with the subsequent deterioration of the quality of the light beam emitted by the automotive light, or even cause the light bulb to come right out of the coupling seat, making the automotive light completely useless.

Some automotive lights manufacturers have at least partially overcome this problem by providing the wedge-base bulb sockets with an additional centering sleeve structured so as to be removably fitted/connected to the entrance of the coupling seat realized in the supporting base. This removable sleeve is also structured to grip the neck that joins the glass bulb to the plug, so to hold the wedge-base light bulb always in the right position inside the coupling seat, i.e. perfectly coaxial with the optical axis of the reflector which is suited to project/direct outwards the light of the light bulb.

More specifically, with reference to European patent No. 1633024, the additional centering sleeve is provided with a number of projecting centering tongues which sticks out from the upper perimetrical rim of the sleeve, and which are suited to abut against the neck of the glass bulb when the wedge-base light bulb is correctly inserted in the socket, inside the centering sleeve.

Unfortunately, since it has to remain in direct contact with the glass bulb that normally reaches temperatures of much more than 100° C., the removable centering sleeve must be made of a plastic material having extremely good heat resistance properties and which is, thus, more valuable and expensive than the material generally used to make the supporting base of the socket, with the resulting significant increase in the production and assembly costs.

Moreover, the socket with additional centering sleeve cannot house wedge-base light bulbs of different sizes, because the additional centering sleeve is structured to surround and support only one specific model of wedge-base light bulb.

SUMMARY OF THE INVENTION

Aim of the present invention is to produce a wedge-base bulb socket which is cheap to manufacture, which enables the correct centering and supporting of the wedge-base light bulb even in difficult vehicle operating conditions, and which finally meets international requirements for light sources, in particular for automotive lights.

Further aim of the present invention is to provide a wedge-base bulb socked capable of receiving/housing wedge-base light bulbs of different sizes.

In compliance with the above aims, according to the present invention there is provided a wedge-base bulb socket structured for supporting a light bulb having a glass bulb which ends in a substantially wedge-shaped plug housing the ends of the two rheophores which feed electric current to the filament housed inside the bulb; the wedge-base bulb socket comprising:

- a supporting base provided with a coupling seat dimensioned to house the wedge-shaped plug of the light bulb;
- two coupling and connecting members which are located inside the coupling seat, and are structured to separately clasp the wedge-shaped plug of the light bulb fitted into the coupling seat, and to feed electric current to the ends of the rheophores of said light bulb; and electricity supplying means which are connected to both coupling and connecting members and are structured to feed electric current to said coupling and connecting members;

the wedge-base bulb socket being characterized in that said electricity supplying means comprise two electrically conductive elements which extend on the surface of the supporting base up to the edge of the entrance of the coupling seat, on opposite sides of said entrance, and then descend into the coupling seat to reach each a respective coupling and connecting member; and two reciprocally-facing additional supporting jaws which are supported by the two electrically conductive elements so as to be located substantially on opposite sides of the entrance of the coupling seat, and which are structured to clamp the wedge-base light bulb fitted into the socket, so as to firmly hold said wedge-base light bulb in the wedge-base bulb socket.

Preferably, though not necessarily, the wedge-base bulb socket is also characterized in that the two additional supporting jaws are made of a material having a high heat-dispersion capacity.

Preferably, though not necessarily, the wedge-base bulb socket is also characterized in that the two additional supporting jaws are made of a metal material.

Preferably, though not necessarily, the wedge-base bulb socket is also characterized in that the two additional supporting jaws are made in one piece with the corresponding electrically conductive elements.

Preferably, though not necessarily, the wedge-base bulb socket is also characterized in that the two additional supporting jaws are structured to clamp the neck of the wedge-base light bulb fitted into the coupling seat.

Preferably, though not necessarily, the wedge-base bulb socket is also characterized in that each electrically conductive element consists of a metal-material strip which extends on surface of the supporting base up to the edge of the entrance of the coupling seat, and then descends into the coupling seat to reach the respective coupling and connecting member.

Preferably, though not necessarily, the wedge-base bulb socket is also characterized in that each additional supporting jaw consists of at least one centering and clamping lug which protrudes from the metal strip, immediately above the entrance of the coupling seat, and is shaped so as to rest on the wedge-base light bulb fitted into the socket.

Preferably, though not necessarily, the wedge-base bulb socket is also characterized in that each additional supporting jaw consists of two centering and clamping lugs which protrude from the two lateral sides of the metal strip, on opposite sides thereof, immediately above the entrance of the coupling seat, and are arched so as to rest on the wedge-base light bulb fitted into the socket.

Preferably, though not necessarily, the wedge-base bulb socket is also characterized in that each coupling and connecting member is made in one piece with the respective electrically conductive element.

Preferably, though not necessarily, the wedge-base bulb socket is also characterized in that each clamping and connecting element comprises a pair of parallel and reciprocally-facing fastening and contacting tongues made of an electrically conductive material and which are arranged parallel and faced one another so as to form the two jaws of a clamp having a shape complementary to that of the plug of the light bulb; the fastening and contacting tongues being made in one piece with the corresponding metal strip.

Preferably, though not necessarily, the wedge-base bulb socket is also characterized in that the supporting base is provided with a protruding collar which forms the entrance of the coupling seat.

Preferably, though not necessarily, the wedge-base bulb socket is also characterized in that the two electrically conductive elements consist of two metal-material strips, which are folded in a substantially a substantially upside-down U shape, and are straddled on the edge of the collar so that each metal strip has a first branch at least partially adhering to the internal surface of the coupling seat, and a second branch at least partially adhering to the external surface of the collar; the first branch of each metal strip extends inside the coupling seat up to reach the corresponding clamping and connecting element; the second branch of each metal strip extends up to reach an power-supply electric circuit arranged on the supporting plate.

Preferably, though not necessarily, the wedge-base bulb socket is also lastly characterized in that the two additional supporting jaws and/or the two electrically conductive elements are made of bronze for springs, steel for springs, stainless steel, phosphor bronze, or the like.

In compliance with the above aims, according to the present invention there is additionally provided an automotive light for motor vehicles and similar comprising:

a rear body which is substantially basin-shaped, and is structured so as to be recessed inside a specific compartment realized in the vehicle body;

at least one light source which is located close to the bottom of said rear body, and is structured to emit light when electricity powered; and a front lenticular body which is made at least partially of a transparent or semi-transparent material, and is arranged to close the entrance of the rear body so to be crossed by the light emitted by said at least one light source;

said automotive light (101) being characterized by also comprising at least one wedge-base bulb socket structured for supporting a light bulb having a glass bulb which ends in a substantially wedge-shaped plug housing the ends of the two rheophores which feed electric current to the filament housed inside the bulb; the wedge-base bulb socket comprising:

a supporting base provided with a coupling seat dimensioned to house the wedge-shaped plug of the light bulb;

two coupling and connecting members which are located inside the coupling seat, and are structured to separately clasp the wedge-shaped plug of the light bulb fitted into the coupling seat, and to feed electric current to the ends of the rheophores of said light bulb; and electricity supplying means which are connected to both coupling and connecting members and are structured to feed electric current to said coupling and connecting members;

said electricity supplying means comprising, in turn, two electrically conductive elements which extend on the surface of the supporting base up to the edge of the entrance of the coupling seat, on opposite sides of said entrance, and then descend into the coupling seat to reach each a respective coupling and connecting member; and two reciprocally-facing additional supporting jaws which are supported by the two electrically conductive elements so as to be located substantially on opposite sides of the entrance of the coupling seat, and which are structured to clamp the wedge-base light bulb fitted into the socket, so as to firmly hold said wedge-base light bulb in the wedge-base bulb socket.

Preferably, though not necessarily, the automotive light is also characterized in that the two additional supporting jaws of the socket are made of a material having a high heat-dispersion capacity.

Preferably, though not necessarily, the automotive light is also characterized in that the two additional supporting jaws of the socket are made of a metal material.

Preferably, though not necessarily, the automotive light is also characterized in that the two additional supporting jaws of the socket are made in one piece with the corresponding electrically conductive elements.

Preferably, though not necessarily, the automotive light is also characterized in that the two additional supporting jaws of the socket are structured to clamp the neck of the wedge-base light bulb fitted into the coupling seat.

Preferably, though not necessarily, the automotive light is also characterized in that each electrically conductive element of the socket consists of a metal-material strip which extends on surface of the supporting base up to the edge of the entrance of the coupling seat, and then descends into the coupling seat to reach the respective coupling and connecting member.

Preferably, though not necessarily, the automotive light is also characterized in that each additional supporting jaw of the socket consists of at least one centering and clamping lug which protrudes from the metal strip, immediately above the entrance of the coupling seat, and is shaped so as to rest on the wedge-base light bulb fitted into the socket.

Preferably, though not necessarily, the automotive light is also characterized in that each additional supporting jaw of the socket consists of two centering and clamping lugs which protrude from the two lateral sides of the metal strip, on opposite sides thereof, immediately above the entrance of the coupling seat, and are arched so as to rest on the wedge-base light bulb fitted into the socket.

Preferably, though not necessarily, the automotive light is also characterized in that each coupling and connecting member of the socket is made in one piece with the respective electrically conductive element.

Preferably, though not necessarily, the automotive light is also characterized in that each clamping and connecting element of the socket comprises a pair of parallel and reciprocally-facing fastening and contacting tongues made of an electrically conductive material and which are arranged parallel and faced one another so as to form the two jaws of a clamp having a shape complementary to that of the plug of the light bulb; the fastening and contacting tongues being made in one piece with the corresponding metal strip.

Preferably, though not necessarily, the automotive light is also characterized in that the supporting base of the socket is provided with a protruding collar which forms the entrance of the coupling seat.

Preferably, though not necessarily, the automotive light is also characterized in that the two electrically conductive elements of the socket consist of two metal-material strips, which are folded in a substantially a substantially upside-down U shape, and are straddled on the edge of the collar so that each metal strip has a first branch at least partially adhering to the internal surface of the coupling seat, and a second branch at least partially adhering to the external surface of the collar; the first branch of each metal strip extends inside the coupling seat up to reach the corresponding clamping and connecting element; the second branch of each metal strip extends up to reach an power-supply electric circuit arranged on the supporting plate.

Preferably, though not necessarily, the automotive light is also characterized in that the two additional supporting jaws of the socket and/or the two electrically conductive elements of the socket are made of bronze for springs, steel for springs, stainless steel, phosphor bronze, or the like.

BRIEF DESCRIPTION OF THE DRAWINGS

A non-limiting embodiment of the present invention will now be described, by way of example, with reference to the accompanying drawings, in which.

DETAILED DESCRIPTION OF THE INVENTION

Figure 1:
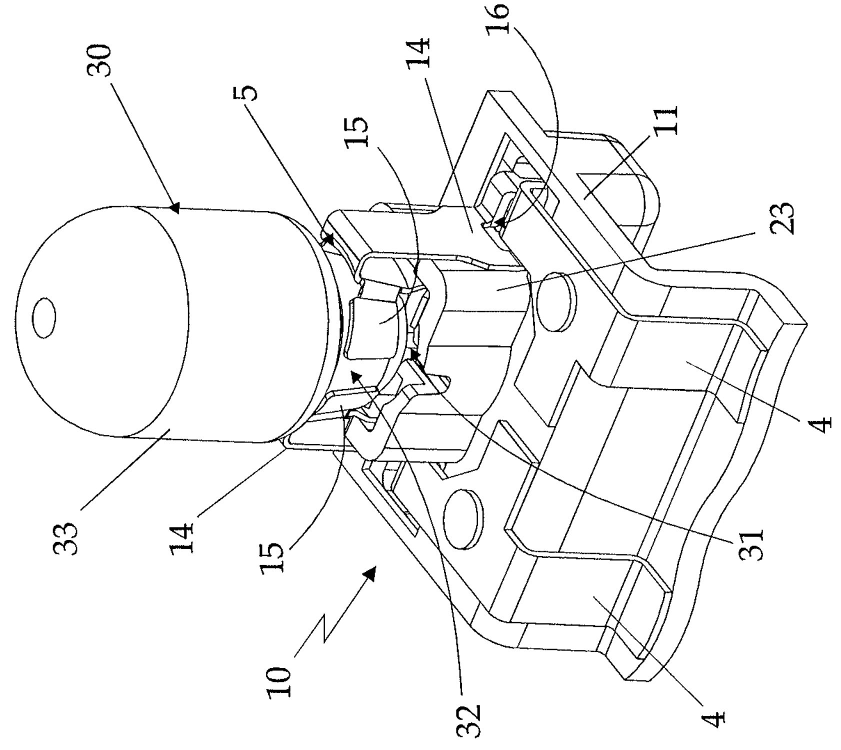
FIGS. 1 and 2 show in perspective view a wedge-base bulb socket realized in accordance with the teachings of the present invention.

With reference to the accompanying figures, number 10 indicates as a whole a socket specifically structured to support wedge-base light bulbs 30, i.e. a socket specifically structured for supporting and supplying electricity to the special filament light bulbs 30 which have a glass bulb 33 that ends in a wedge-shaped head or plug 31 which, in turn, is structured to be inserted/pressed, without rotation, into the socket 10 and houses the ends of the two rheophores which allow to carry the electric current to the filament 36 housed inside bulb 33.

More specifically, glass bulb 33 joins to plug 31 via a tapered neck 32 which slims towards the plug 31.

Figure 6:
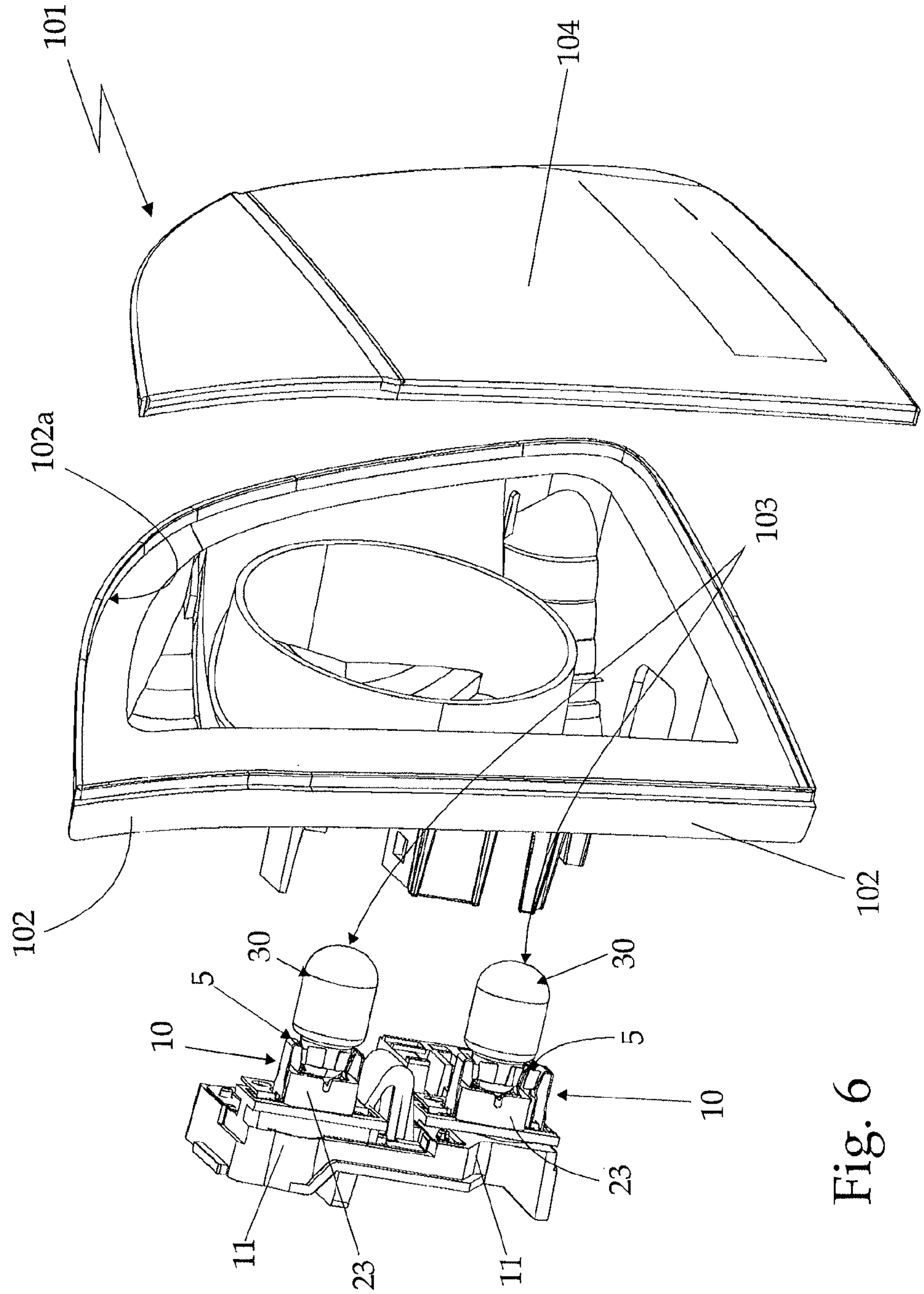
FIG. 6 is an exploded perspective view of an automotive light incorporating the socket disclosed in FIGS. 1 to 5.

With reference to FIG. 6, socket 10 is particularly suitable for being mounted into a front or rear automotive light 101 for motor vehicles or similar, in order to support a corresponding conventional wedge-base light bulb.

In the example shown, in particular, automotive light 101 comprises: a rigid rear body or shell 102 that is substantially basin-shaped, and is structured to be firmly recessed in a specific compartment obtained in the front or rear part of the vehicle body; at least one light source 103 which is placed close to the bottom of rear body 102, and is structured to emit light when electricity powered; and a front lenticular body 104 which is made at least partially of a transparent or semi-transparent material, optionally even coloured, and is arranged to close the entrance 102*a* of rear body 102, so as to surface outside of the vehicle body and to be crossed by the light emitted by light source 103.

More specifically, in the example shown the automotive light 101 is provided with two independent light sources 103, whereas lenticular body 104 is made of a transparent or semi-transparent plastic material, optionally even coloured, and is provided with two separate transparent or semi-transparent portions, each of which faces a respective light source 103.

With reference to FIG. 6, each light source 103 consists of a conventional wedge-base light bulb 30, which is removably fitted in a corresponding wedge-base bulb socket 10 which, in turn, is structured to be connected/fitted in a rigidly and firmly, though easily removable manner, inside a specific through hole realized on the bottom of rear body 102, so to let the bulb 33 of wedge-base light bulb 30 protrude inside body 102.

Figure 2:
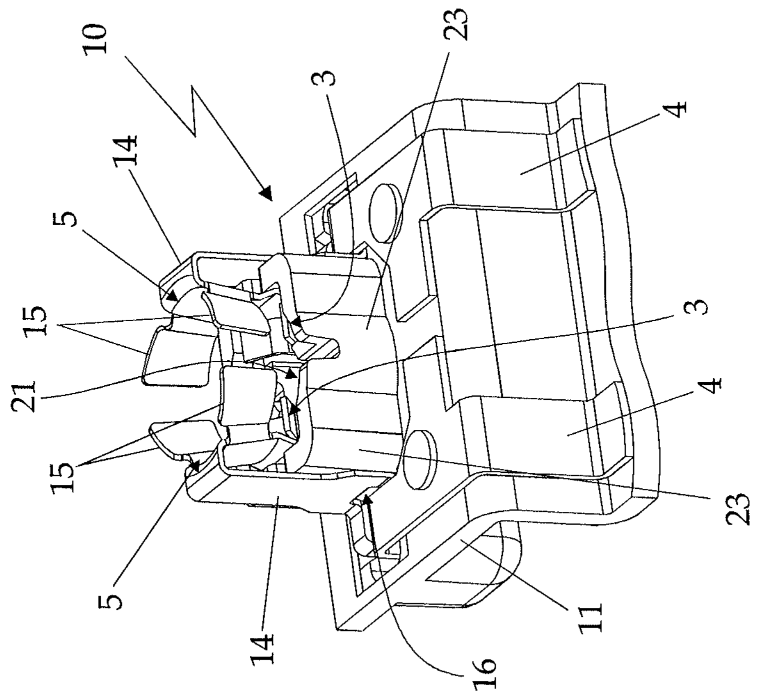
Figure 3:
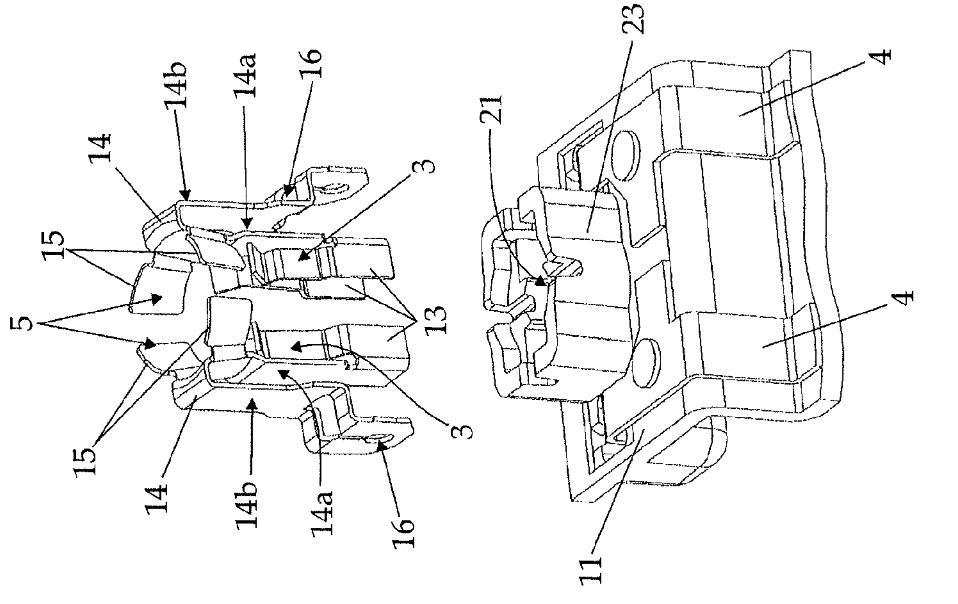
FIG. 3 is an exploded perspective view of the FIG. 2 socket.

With reference to FIGS. 1, 2 and 3, socket 10 comprises: a supporting plate or base 11 preferably, though not necessarily, made of a plastic material, and which is provided with a coupling seat 21 dimensioned to receive/house the plug 31 of the wedge-base light bulb 30; and two coupling and connecting members 3 which are housed close to the bottom of the coupling seat 21, and are structured to embrace and hold two distinct and separate portions of the plug 31 of the light bulb fitted into coupling seat 21, so as to hold the terminal head or plug 31 firmly in the coupling seat 21, and so to simultaneously allow the electric current to feed to the two rheophores 35 of the wedge-base light bulb 30.

More specifically, each of the two coupling members 3 is structured so to be able to permanently touch the end of a respective rheophore 35 which emerges from the terminal head or plug 31 of the wedge-base light bulb 30, and is at least partially made of an electrically conductive material so as to allow electric current to flow to and from the corresponding rheophore 35; and socket 10 also comprises two electrically conductive elements 14, which extend on surface of supporting base 11, up to the edge of the entrance of coupling seat 21, on opposite sides of said entrance, and then descend into the coupling seat 21 to reach each a respective coupling and connecting member 3, in order to feed electric current to the coupling member 3.

With reference to FIGS. 1, 2 and 3, differently from currently known wedge-base bulb sockets, the two electrically conductive elements 14 of socket 10 elastically support two additional supporting and clamping jaws 5, which are arranged one in front of the other, on opposite sides of the coupling seat 21, which are made of a material having a high heat dispersion capacity (i.e. a material with good heat conduction properties), and which are structured so as to be able to rest on the light bulb 30 fitted into socket 10, on opposite sides thereof, so to hold the wedge-base light bulb 30 in place in the socket 10 in addition to the coupling members 3.

In the example shown, in particular, the two supporting and clamping jaws 5 are preferably, though not necessarily, made of an elastically-deformable metal material; are preferably, though not necessarily, arranged immediately above the entrance of the coupling seat 21, so that each one is above a respective coupling member 3; and are structured so as to be able to rest against the neck 32 of the wedge-base light bulb 30 that is fitted into socket 10, on opposite sides of said wedge-base light bulb.

Figure 4:
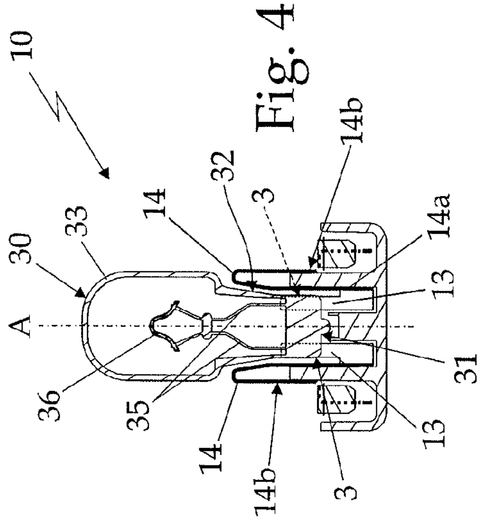
FIGS. 4 and 5 are two cross-sectional side views of the FIG. 1 socket.

With reference to FIGS. 2, 3 and 4, in the example shown, in particular, each electrically conductive element 14 preferably, though not necessarily, consists of a metal material strip 14 which extends on surface of supporting base 11, up to the edge of the entrance of coupling seat 21, on opposite sides of said entrance, and then descends into the coupling seat 21 up to reach a relative coupling and connecting member 3, so as to feed electric current to said coupling member 3.

More specifically, in the example shown supporting base 11 is preferably, though not necessarily, provided with a protruding collar 23 which stick out of surface of supporting base 11, and forms the entrance of coupling seat 21; and the two electrical conductive elements 14 consist of two metal-material strips 14 which are folded in a substantially upside-down U shape, and are straddled on the edge of collar 23 so that each metal strip 14 has a first branch 14*a* that at least partially adheres to the internal surface of collar 23, i.e. to the internal surface of coupling seat 21, and a second branch 14*b* that at least partially adheres to the external surface of collar 23.

The internal branch 14*a* of each metal strip 14 extends inside the coupling seat 21 up to reach the corresponding coupling member 3; the external branch 14*b* of each metal strip 14 extends up to reach a corresponding terminal of a power-supply electric circuit 4 which is attached to the supporting plate 11 in known manner.

More specifically, in the example shown, the lower end of the external branch 14*b* of each electric supply metal strip 14 is preferably, though not necessarily, provided with a longitudinal groove 16 which is structured to be engaged by a corresponding coupling tongue located on the terminal of electric circuit 4, so to allow the electric connection of the electric supply metal strip 14 to electric circuit 4, and the contextual rigid fixing of metal strip 14 on supporting base 11.

With reference to FIG. 3, in the example shown, moreover, the two electric supply metal strips 14 are made of an elastically-deformable metal material having a high heat dispersion capacity, i.e. with good thermal conductivity, and the two additional supporting and coupling jaws 5 are made in one piece with said electric supply metal strips 14.

Figure 5:
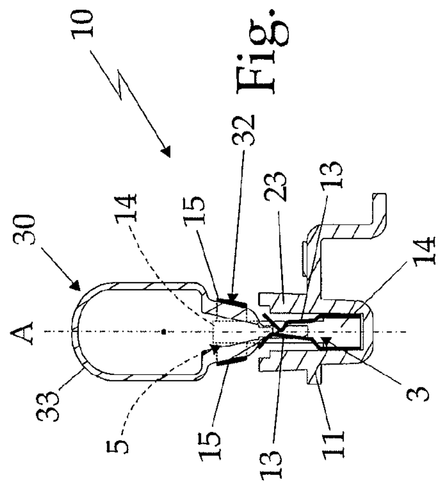

More specifically, with reference to FIGS. 1, 2 and 5, in the example shown each electric supply metal strip 14 is superiorly provided with two lateral centering and coupling lugs 15 which protrude from the two lateral sides of the strip 14, on opposite sides thereof and immediately above the entrance of the coupling seat 21, and are dimensioned to rest on the light bulb 30 fitted into the socket.

In particular, the two lateral centering and coupling lugs 15 are preferably, though not necessarily, arch bended towards the centre of coupling seat 21, so as to jut out above the coupling and connecting members 3, and so as to form an arch-shaped jaw 5 which defines a circumference which is coordinated/complementary to the circumference of the light-bulb neck 32, so as to embrace and clamp the neck 32 of the wedge-base light bulb 30 fitted into socket 10.

Clearly the two lateral centering and coupling lugs 15 have a flexible structure, and form a one piece with the corresponding electric supply metal strip 14.

With reference to FIGS. 2, 3 and 4, in the example shown, in particular, each pair of lateral lugs 15 protrude from the lateral sides of the corresponding electric supply metal strip 14, right by the upper end of the internal branch 14*a* of said metal strip 14.

In addition to the above, each metal strip 14 is preferably, though not necessarily, made of tinned surface coated bronze for springs, coppered and tinned hardened steel for springs, stainless steel, phosphor bronze, or another metal suitable for the purpose.

As regards the coupling and connecting members 3, each connecting member 3 consists of a pair of parallel and reciprocally facing fastening and contacting tongues 13 which are made of an electrically conductive metal material, and are arranged parallel and faced one another so as to form the two jaws of a clamp having a shape complementary to that of the plug 31 of the wedge-based bulb 30. The two fastening and contacting tongues are also reciprocally joined in an elastically deformable manner, so as to embrace and grip the plug 31 located in the coupling seat 21, and are located on the bottom of the coupling seat 21 so as to be locally substantially parallel to the internal surface of the coupling seat 21, and locally substantially parallel to and facing the two tongues 13 that form the other coupling and connecting member 3.

More specifically, with reference to FIGS. 3 and 5, each tongue 13 of connecting member 3 has, starting from the bottom of coupling seat 21, a lower portion which is locally substantially parallel to the corresponding lower portion of the other tongue 13 of connecting member 3; an intermediate portion locally converging towards the corresponding intermediate portion of the other tongue 13 of the connecting member 3; and an upper portion locally diverging from the corresponding upper portion of the other tongue 13 of the coupling and connecting member 3.

The two tongues 13 forming each connecting member 3 are also connected to the lower end of the internal branch 14*a* of the corresponding electric supply metal strip 14, at the lower portion thereof.

More specifically, in the example shown, the two tongues 13 forming each coupling and connecting member 3 are in one piece with the internal branch 14*a* of the electric supply metal strip 14, and are thus made of the same material as the two electric supply metal strips 14, and the relative lateral centering and coupling lugs 15.

In other words, the two tongues 13 forming each coupling and connecting member 3 are also preferably, though not necessarily, made of tinned surface coated bronze for springs, coppered and tinned hardened steel for springs, stainless steel, phosphor bronze, or another metal suitable for the purpose.

Thus, the electric supply metal strip 14, the lateral lugs 15 that form the jaw 5 of the metal plate, and the two tongues 13 forming the coupling and connecting member 3 integral with the strip 14, can be made in one piece, for example, by means of a single shearing and cold press moulding process, thus cutting production costs and times.

In use, the plug 31 of the light bulb 30 is inserted into coupling seat 21 with a movement parallel to the axis A of the coupling seat 21, in order to reach the coupling members 3 from above. The particular V-shaped design of the upper part of the two fastening and contacting tongues 13 forming each coupling and connecting member 3, thanks to the diverging upper portions, acts as a guide for inserting of plug 31.

When the plug 31 is completely inside coupling seat 21, the lateral centering and clamping lugs 15 elastically clasp neck 32 of the light bulb 30, embracing it from opposite sides.

The centering and clamping lugs 15 act both as centering elements during the insertion of the light bulb 30, and as stabilizers to hold the light bulb 30 firmly in place in the socket 10 in case of vibrations. Moreover, being made of a material having a high heat dispersion capacity, the two additional supporting jaws (i.e. the lateral lugs 15 present on the electric supply metal strips 14) are capable, when the light bulb is powered, of absorbing heat from the neck 32 of the light bulb, and of dissipating it into the surrounding environment without transmitting it, or limiting ins transmission to the supporting base 11 beneath.

The advantages deriving from the presence of the additional supporting and clamping jaws 5 are noteworthy. Firstly, socket 10 is more economical to produce than the wedge-base bulb sockets provided with an additional centering sleeve, while offering an equal or grater resistance to mechanical vibrations than that offered by conventional wedge-base bulb sockets provided with an additional centering sleeve.

Moreover, the use of a high thermal conductivity metal to produce the jaws 5 allows a large amount of the heat produced by the light bulb 30 to be dissipated into the environment, thus reducing the risk of permanent deformation of the supporting base 11 due to excessive heat absorption during operation. The greater ability to dissipate the heat produced by the light bulb 30 results in the use of lower grade plastic materials for the production of supporting base 11.

Finally supporting and clamping jaws 5, i.e. the lugs 15 which juts out from the two lateral sides of the metal strip 14, can be dimensioned in order to achieve sufficient flexibility to adapt themselves to wedge-base light bulbs of different sizes.

Clearly, changes may be made to the wedge-base bulb socket 10 disclosed above without, however, departing from the scope of the present invention.

For example, the shape of the fastening and contact tongues 13 of the coupling members 3 may differ from those described and illustrated herein, depending on the different types of light bulb.

Moreover, the shape of the lateral centering and clamping lugs 15, i.e. the jaws 5, may differ from those described above. For example, according to an alternative non-shown embodiment, each electric supply metal strips 14 can be provided with a single centering and clamping lug 15, jutting out from said metal strip. In which case, the lugs 15 of the two metal strips 14 are arranged on opposite sides of the entrance of the coupling seat 21, defining two diametrically opposed portions of the circumference of the light-bulb neck 32.

It is also clear that, although socket 10 is described herein with reference to certain specific examples, the man skilled in the art will be able to produce many other equivalent forms of a wedge-base bulb socket, having the features set forth in the claims and thus falling within the scope of this invention.

The invention claimed is:

1. A wedge-base bulb socket structured for supporting a light bulb having a glass bulb which ends in a substantially wedge-shaped plug housing the ends of the two rheophores which feed electric current to the filament housed inside the bulb, the wedge-base bulb socket comprising:

a supporting base provided with a coupling seat dimensioned to house the wedge-shaped plug of the light bulb;

two coupling and connecting members located inside the coupling seat, and structured to separately clasp the wedge-shaped plug of the light bulb fitted into the coupling seat, and to feed electric current to the ends of the rheophores of said light bulb; and electricity supplying means connected to both coupling and connecting members and structured to feed electric current to said coupling and connecting members;

wherein the electricity supplying means comprise two electrically conductive elements which extend on the surface of the supporting base up to the edge of the entrance of the coupling seat, on opposite sides of said entrance, and then descend into the coupling seat to reach each a respective coupling and connecting member; and two reciprocally-facing additional supporting jaws which are supported by the two electrically conductive elements so as to be located substantially on opposite sides of the entrance of the coupling seat, and which are structured to clamp the wedge-base light bulb fitted into the socket, to firmly hold said wedge-base light bulb in the wedge-base bulb socket.

2. The wedge-base bulb socket according to claim 1, characterized in that the two additional supporting jaws are made of a material having a high heat-dispersion capacity.

3. The wedge-base bulb socket according to claim 2, wherein the two additional supporting jaws are made of a metal material.

4. The wedge-base bulb socket according to claim 2, wherein the two additional supporting jaws are made in one piece with the corresponding electrically conductive elements.

5. The wedge-base bulb socket as claimed in claim 1, wherein the two additional supporting jaws are structured to clamp the neck of the wedge-base light bulb fitted into the coupling seat.

6. The wedge-base bulb socket as claimed in claim 1, wherein each electrically conductive element consists of a metal-material strip which extends on the surface of the supporting base up to the edge of the entrance of the coupling seat, and then descends into the coupling seat to reach the respective coupling and connecting member.

7. The wedge-base bulb socket as claimed in claim 6, wherein each additional supporting jaw consists of at least one centering and clamping lug which protrudes from the metal strip, immediately above the entrance of the coupling seat, and is shaped so as to rest on the wedge-base light bulb fitted into the socket.

8. The wedge-base bulb socket as claimed in claim 7, wherein each additional supporting jaw consists of two centering and clamping lugs which protrude from the two lateral sides of the metal strip, on opposite sides thereof, immediately above the entrance of the coupling seat, and are arched so as to rest on the wedge-base light bulb fitted into the socket.

9. The wedge-base bulb socket as claimed in claim 1, wherein each coupling and connecting member is made in one piece with the respective electrically conductive element.

10. The wedge-base bulb socket as claimed in claim 9, wherein each clamping and connecting element comprises a pair of parallel and reciprocally-facing fastening and contacting tongues made of an electrically conductive material and which are arranged parallel and faced one another so as to form the two jaws of a clamp having a shape complementary to that of the plug of the light bulb; the fastening and contacting tongues being made in one piece with the corresponding metal strip.

11. The wedge-base bulb socket as claimed in claim 1, wherein the supporting base is provided with a protruding collar which forms the entrance of the coupling seat.

12. The wedge-base bulb socket as claimed in claim 11, wherein the two electrically conductive elements consist of two metal-material strips, which are folded in a substantially a substantially upside-down U shape, and are straddled on the edge of the collar so that each metal strip has a first branch at least partially adhering to the internal surface of the coupling seat, and a second branch at least partially adhering to the external surface of the collar; the first branch of each metal strip extends inside the coupling seat up to reach the corresponding clamping and connecting element; the second branch of each metal strip extends up to reach an power-supply electric circuit arranged on the supporting plate.

13. The wedge-base bulb socket as claimed in claim 1, wherein the two additional supporting jaws and the two electrically conductive elements are made of bronze for springs, steel for springs, stainless steel, or phosphor bronze.

14. Automotive light for motor vehicles and similar comprising:

- a rear body which is substantially basin-shaped, and is structured so as to be recessed inside a specific compartment realized in the vehicle body;
- at least one light source which is located close to the bottom of said rear body, and is structured to emit light when electricity powered;
- a front lenticular body which is made at least partially of a transparent or semi-transparent material, and is arranged to close the entrance of the rear body to be crossed by the light emitted by said at least one light source; and
- at least one wedge-base bulb socket,
- wherein the at least one wedge-base bulb socket includes (i) a supporting base provided with a coupling seat dimensioned to house a wedge-shaped plug of a light bulb; (ii) two coupling and connecting members located inside the coupling seat, and structured to separately clasp the wedge-shaped plug of the light bulb fitted into the coupling seat, and to feed electric current to the ends of rheophores of the light bulb; and (iii) electricity supplying means connected to both coupling and connecting members and structured to feed electric current to said coupling and connecting members;
- wherein the electricity supplying means comprise two electrically conductive elements which extend on the surface of the supporting base up to the edge of the entrance of the coupling seat, on opposite sides of said entrance, and then descend into the coupling seat to reach each a respective coupling and connecting member; and two reciprocally-facing additional supporting jaws which are supported by the two electrically conductive elements so as to be located substantially on opposite sides of the entrance of the coupling seat, and which are structured to clamp the wedge-base light bulb fitted into the socket, to firmly hold said wedge-base light bulb in the wedge-base bulb socket.

* * * * *